United States Patent [19]

Ward

[11] 4,289,120

[45] Sep. 15, 1981

[54] SOLAR HEAT COLLECTING APPARATUS

[76] Inventor: William H. Ward, 2 Albion La., Cincinnati, Ohio 45246

[21] Appl. No.: 63,301

[22] Filed: Aug. 2, 1979

[51] Int. Cl.³ .............................................. F24J 3/02
[52] U.S. Cl. ................................................... 126/450
[58] Field of Search ............... 126/417, 450, 432, 428, 126/429, 443, DIG. 2

[56] References Cited

U.S. PATENT DOCUMENTS

| | | | |
|---|---|---|---|
| 3,960,135 | 6/1976 | Angilletta | 126/450 |
| 3,980,071 | 9/1976 | Barber, Jr. | 126/447 |
| 4,112,919 | 9/1978 | Davis | 126/429 |

Primary Examiner—Carroll B. Dority, Jr.
Assistant Examiner—Robert J. Marett
Attorney, Agent, or Firm—Biebel, French & Nauman

[57] ABSTRACT

A solar heat collecting device is provided which is modular in design and easily removable from its location adjacent the roof or wall of a structure, into the interior thereof for maintainance without disturbing the exterior surface of the roof or wall and thereby eliminates many of the difficulties associated with removal and maintainance of prior art collectors which are only removable from the exterior of the structure. The present invention reduces the possibility of leakage in the roof or wall where normal solar collectors would be secured and removed. The device includes a box-like housing having a substantial planar base portion and four upstanding side walls, an insulation disposed inside the housing and extending coextensive with the base portion, a solar heat collection member disposed within the housing which has associated conduits for circulating heat conducting fluid therethrough for use at a remote location, a transparent cover member permanently securable to the outer surface of the wall or roof of the structure to become a part thereof and which overly covers an opening defined in the wall or roof of substantially coextensive dimensions with the housing and in which the housing is inserted from the inside of the structure, and brackets mounting the housing within the opening defined in the wall or roof for easy removal into the interior of the structure for service or maintainance of the solar heat collection device without removal of the transparent cover member which is permanently secured to the outer surface of the structure.

6 Claims, 4 Drawing Figures

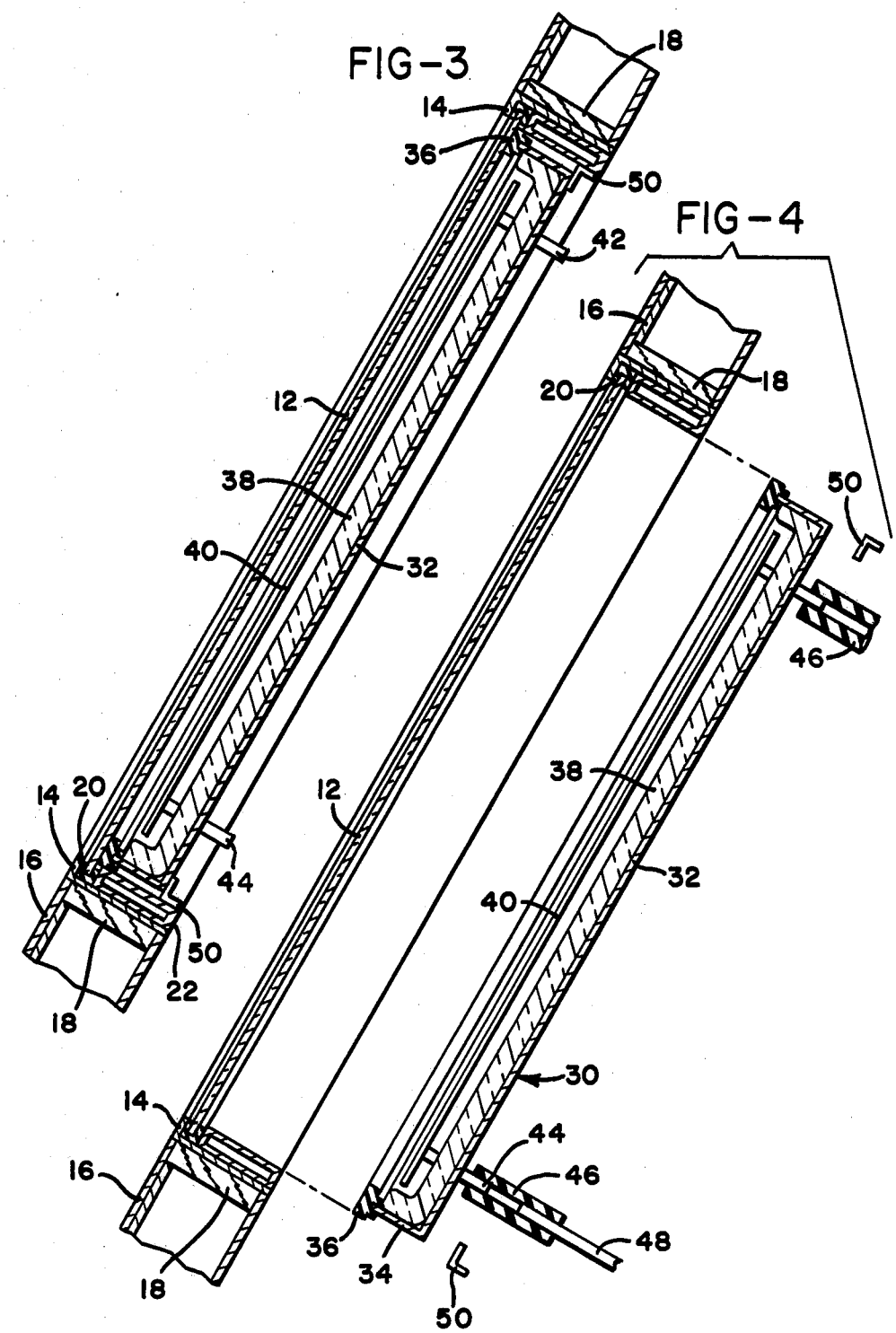

SOLAR HEAT COLLECTING APPARATUS

BACKGROUND OF THE INVENTION

1. Field of the Invention

The present invention relates to solar collecting devices, and more particularly, to a solar collecting device which is easily removable from the structure to which it is mounted for ease of maintainance and repair.

2. Prior Art

At present, most solar collectors are manufactured as self contained, weather-proof boxes and are arranged on either a roof or adjacent to a building which is to be solar heated. Such devices are generally mounted in a frame work or stand upon the roof, or as an alternative method, are grouped next to each other on the roof structure and are sealed around the edges. In some installations the collectors also become the surface of the roof. In the former instance, one must have the expense of a weather-tight roof on which the collectors are mounted in a frame. In the latter case, the cost of the roofing surface is saved, but one inherits a rough surface which is leak prone due to the many surface cracks and joints inherent in an assembly of collectors.

Additionally, in either of these types of installations of collectors maintenance or replacement of an element in the collector system becomes quite expensive. In the case of either, the maintenance work must be done in the inconvenient environment of the roof. The weather sealing must be broken in order to perform the maintenance or replacement work which very likely renders the system more leak prone than was the case at the offset.

A typical example of a design which is fastened to the upper surface of a structure and forms an integral part of the roof is disclosed, for example, by U.S. Pat. No. 3,980,071. This patent also alternatively discloses securing such devices to the upper surface of an existing roof. In any event, it can be seen that such structures have an abundance of seals, flashing and cap members which hold the various parts of the collectors together and secure them to the structure.

SUMMARY OF THE INVENTION

The present invention overcomes the above described difficulties and disadvantages associated with prior art collectors which are either integrally formed in the roof or are intended to be added to the upper surface of a roof, by providing a transparent cover member which actually forms a portion of the outer surface of the roof or wall of a structure and behind which is removably secured the solar heat collecting device and the housing which holds it, in order to permit ease of removal for maintenance and repair.

These advantages over prior art devices are obtained by providing a solar heat collecting device having a box like housing of generally rectangular cross section with a substantially planar base portion and four upstanding side walls, insulation means disposed inside the housing and extending substantially coextensive with the base portion, solar heat collection means disposed within the housing above the insulation means parallel to the base portion of the housing and having means for circulating a heat conducting fluid therethrough to and from a remote location, a transparent cover member extending beyond the side wall portions of the housing and permanently securable to the outer surface of a wall or roof of the structure and overly covering an opening defined in the wall or roof of substantially coextensive rectangular cross section as the housing, and means for mounting the housing within the opening defined in the wall or roof for removal into the interior of the structure for service or maintenance of the solar heat collection means without removal of the transparent cover member from the roof or wall of the structure.

The solar collecting means itself is generally of conventional construction in which a plate of heat absorption material is associated with a flow path for the fluid so that heat will be transferred from the plate to the fluid as it is picked up from the sun. The fluid is supplied to inlet and outlet conduits associated with the flow path of the liquid through the heat collection device which permits the fluid to be pumped or otherwise removed to a remote location for use for heating a building, etc. The solar collecting means is preferably connected to the housing along with the insulation means so that all can be removed as a unit from the back side of the transparent cover member which is an integral part of the roof. A resilient sealing member is mounted to the upper edge portion of the upstanding side walls of the housing and engages the back surface of the transparent cover member of the roof or its adjacent supporting structure to sealingly engage the same when the housing is secured in position. A plurality of removable brackets are utilized to hold the housing and collecting device with the resilient sealing member engaged with the back side of the transparent cover member and are securable to adjacent support member, such as joists or cross beams in the roof or side walls of a structure, and can be easily removed to permit removal of the housing and its contents.

BRIEF DESCRIPTION OF THE DRAWINGS

FIG. 3 is a partial cross sectional view through line 3—3 of FIG. 1 illustrating the preferred embodiment of the present invention secured in the assembled position; and FIG. 4 is an expanded cross sectional view similar to FIG. 3 illustrating removal of the brackets, housing and solar collecting means from the transparent cover member forming a portion of the roof.

DETAILED DESCRIPTION OF THE PREFERRED EMBODIMENT

Figure 1:
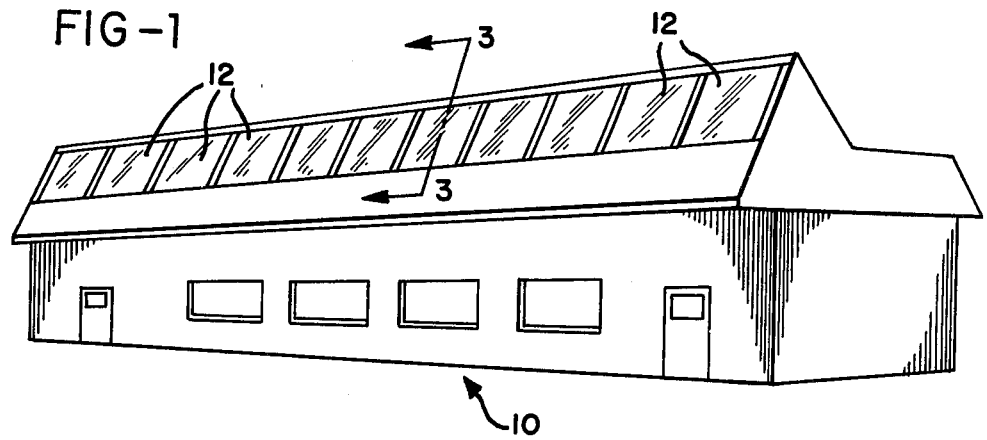
FIG. 1 is a pictorial elevational view of a building utilizing a plurality of the solar heat collecting devices of the present invention disposed in the roof thereof.
Figure 2:
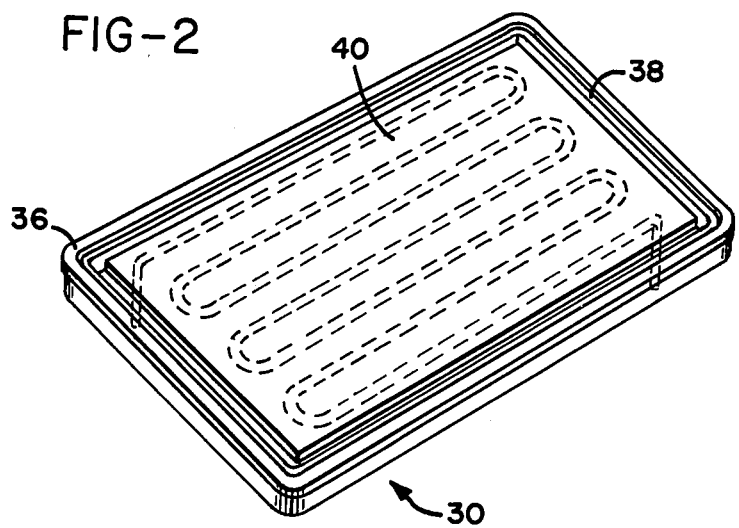
FIG. 2 is a pictorial illustration of a solar heat collecting device and insulation means disposed in a housing which together form the removable portion of the preferred embodiment of the present invention.

The exterior view of the building 10 in FIG. 1 illustrates the positioning of the transparent cover members 12 in a steeply slanted portion of the roof of the building which is generally a conventional location for solar collecting devices. However, the transparent cover members 12 are permanently affixed to the structure as an integral part of the roof and are permanently sealed to prevent leakage and thus are as effective as any other roof covering commonly used where solar collecting devices are not utilized.

The transparent cover members 12 can be of any desired material such as glass or plastic, so long as the material properties are sufficient to provide a relatively long life when exposed to the elements and weather conditions at the locations where the structure is to be utilized. As used in the present context, the term "transparent" means any material which will permit passage of solar radiation, for example, wave lengths on the order to 0.4–2.5 microns, although this range is not intended to be a limit on the wave length which the transparent members are permitted to pass.

As is illustrated for example in the enlarged cross sectional view of FIGS. 3 and 4, the transparent cover members 12 are each individually permanently mounted in the roof structure. As an example of how this can be accomplished, a rectangular generally L-shaped cross section metal housing 14 is fitted in a rectangular opening in the upper surface of the roof 16 and is permanently secured to the supporting frame structure 18 of the roof. Each individual transparent cover member 12 is provided with a resilient sealing member such as the U-shaped cross section member 20 which is compressed and held in position by a rectangular cross-section framing member 22 which is bolted or otherwise mounted to housing 14 and securely holds the transparent cover member 12 in position so as to form a permanent, integral part of the roof structure that will not leak and will not have to be removed in order to service the solar collecting devices.

Referring now to the removable portion of the device, a rigid housing 30 having a planar base portion 32 and upstanding side wall portions 34 which form an open pan-shaped structure provides the basic support for the removable members. At the upper edge portions for each of the upstanding side walls 34 is a resilient sealing member 36 which extends completely around the upper surface of the housing 30 and has its outermost surface flat for engagement with the inner surface of transparent cover member 12. Disposed in the bottom of housing 30 and secured to the planar portion 32 and extending up the inside of side walls 34 is an insulating member 38 which reduces heat loss through the back of the device and enhances the efficiency of the collectors as is well known in the art.

Mounted immediately above the insulation member 38 is the solar collecting device 40. This device can be of many presently available constructions and it is contemplated that any type of solar heat collection device can be utilized with the present invention so long as it is susceptible to positioning in the housing and is easily removed along with the housing to effect the advantages of the present invention. The solar heat collecting device 40 can also utilize any fluids such as gas or liquid, or whatever is compatible with a given solar heat collecting device 40 to be utilized.

In any event, all such solar heat collecting devices 40 are provided with inlet and outlet conduits 42 and 44, respectively, which extend through corresponding openings in the back side of housing 30 where they can be coupled by flexible or rigid removable couplings to the main circulating conduits which are secured to the structure or building and circulate the fluid from the heat collecting device to the air handling equipment (not shown) in a remote location of the building from the position of the solar heat collecting devices 40. An example of such a coupling is illustrated in FIG. 4 on the outlet conduit 44 in which a flexible plastic tubing 46 interconnects the outlet conduit 44 with a main fluid flow conduit 48. Obviously, any type of releasable coupling would be acceptable, so long as it permits removal of the entire housing and its contents for maintenance and repair or replacement.

The assembly of housing 30, seal 36 and solar heat collecting means 40 is held in position with the seals 36 in engagement with the back side of transparent cover member 12 by removable L-shaped brackets 50 which are positioned at various locations around the outer bottom of planar portion 32 of housing 30 and are bolted or otherwise secured to the adjacent surface of bracket 22 to hold the housing and its contents in position.

Thus, it can be seen that the device of the present invention provides unique advantages in permitting access, maintainance and repair of the solar heat collecting devices 40 without requiring removal from the roof or requiring repairman to work in adverse weather conditions. Instead, the workman can merely remove the bolts holding the brackets 50 in position and remove the flexible couplings 46 and thus withdraw the housing into the interior of the building without disturbing the seals on the transparent cover member 12 and thus not increasing the possibility of leaks that results when conventional systems are maintained. It is further contemplated that a plurality of extra solar heat collecting devices and housing assemblies can be kept so that if a solar heat collecting device which is in position needs maintenance it can be removed and immediately replaced with a similar unit while the other unit is being repaired, thus not requiring shutting down of the system until necessary repairs are made.

Although the foregoing illustrates the preferred embodiment of the present invention, other variations are possible. All such variations as would be obvious to one skilled in this art are intended to be included within the scope of the invention as defined by the following claims.

What is claimed is:
1. A solar heat collecting device comprising:
   a wall or roof portion of a structure defining an opening therein;
   a box-like housing of generally rectangular cross section substantially coextensive with and positionable in said opening defined in said wall or roof and having a substantially planar base portion and four upstanding side walls connected thereto;
   insulation means disposed inside said housing and extending substantially coextensive with the base portion thereof;
   solar heat collection means disposed within said housing above said insulation means parallel to said base portion of said housing and having means for circulating a heat conducting fluid therethrough to and from a remote location;
   a transparent cover member extending beyond said side wall portions of said housing and permanently securable to the outer surface of said wall or roof of said structure and overly covering said opening defined in said wall or roof of substantially coextensive rectangular cross section as said housing;
   means fixedly securing said cover member to said wall or roof; and
   means for mounting said housing within said opening defined in said wall or roof for removal into the interior of said structure for service and maintenance of said solar heat collection means without removal of said transparent cover member from said wall or roof of said structure.
2. A solar collection device as defined in claim 1 wherein said mounting means includes:

a resilient sealing member engaging the upper edges of said side wall portions in said housing around the entire periphery thereof for providing sealing engagement with the back side of said transparent cover member;

a framing member located within said wall or roof opening;

bracket members removably mountable to said framing members on the inside of said wall or roof immediately adjacent said opening defined therein, and which brackets contact the outside surface of said base portion of said housing to hold said housing in position in said opening in said wall or roof.

3. A solar heat collecting device as defined in claim 2 wherein said means for circulating fluid through said solar heat collection means includes:

conduits mounted to the interior of said structure for transporting said fluid to and from a remote location from said collection means for use;

means for releasably coupling end portions of said conduits to said collection means.

4. In a structure having upstanding walls and an overly covering roof with a generally rectangular opening defined in either said wall or roof, the improvement comprising:

a box-like housing member of generally rectangular cross section substantially coextensive with said opening in said structure and having a substantially planar base portion and four upstanding side walls connected thereto;

insulation means disposed inside said housing and extending substantially coextensive with the base portion of said housing;

solar heat collection means disposed within said housing above said insulation means parallel to said base portion of said housing and having means for circulating a heat conducting fluid therethrough to and from a remote location;

a transparent cover member extending beyond said side side wall portions of said housing overly covering said opening defined in said wall or roof;

means fixedly securing said cover member to said wall or roof; and means for mounting said housing within said opening defined in said wall or roof for removal into the interior of said structure for service and maintenance of said solar heat collection means without removal of said transparent cover member from said wall or roof.

5. A structure as defined in claim 4 wherein said mounting means includes a framing member secured to said structure immediately adjacent and on at least two opposing sides of said opening in said wall or roof extending inwardly on the inside of said structure and said means for mounting said housing includes brackets removably secured to said framing member and extending under the back surface of the base portion of said housing to hold said housing in place adjacent the back side of said cover member; and resilient sealing means engaging the upper edges of said side wall portions of said housing and sandwiched between the cover member and the side wall portions of the housing to provide a seal between said housing and said cover member.

6. A structure as defined in claim 5 wherein said means for circulating fluid through said solar heat collection means includes:

conduits mounted to the interior of said structure for transporting said fluid to and from a remote location from said collection means for use;

means for releasably coupling end portions of said conduits to said collection means.

* * * * *